Patented June 13, 1933

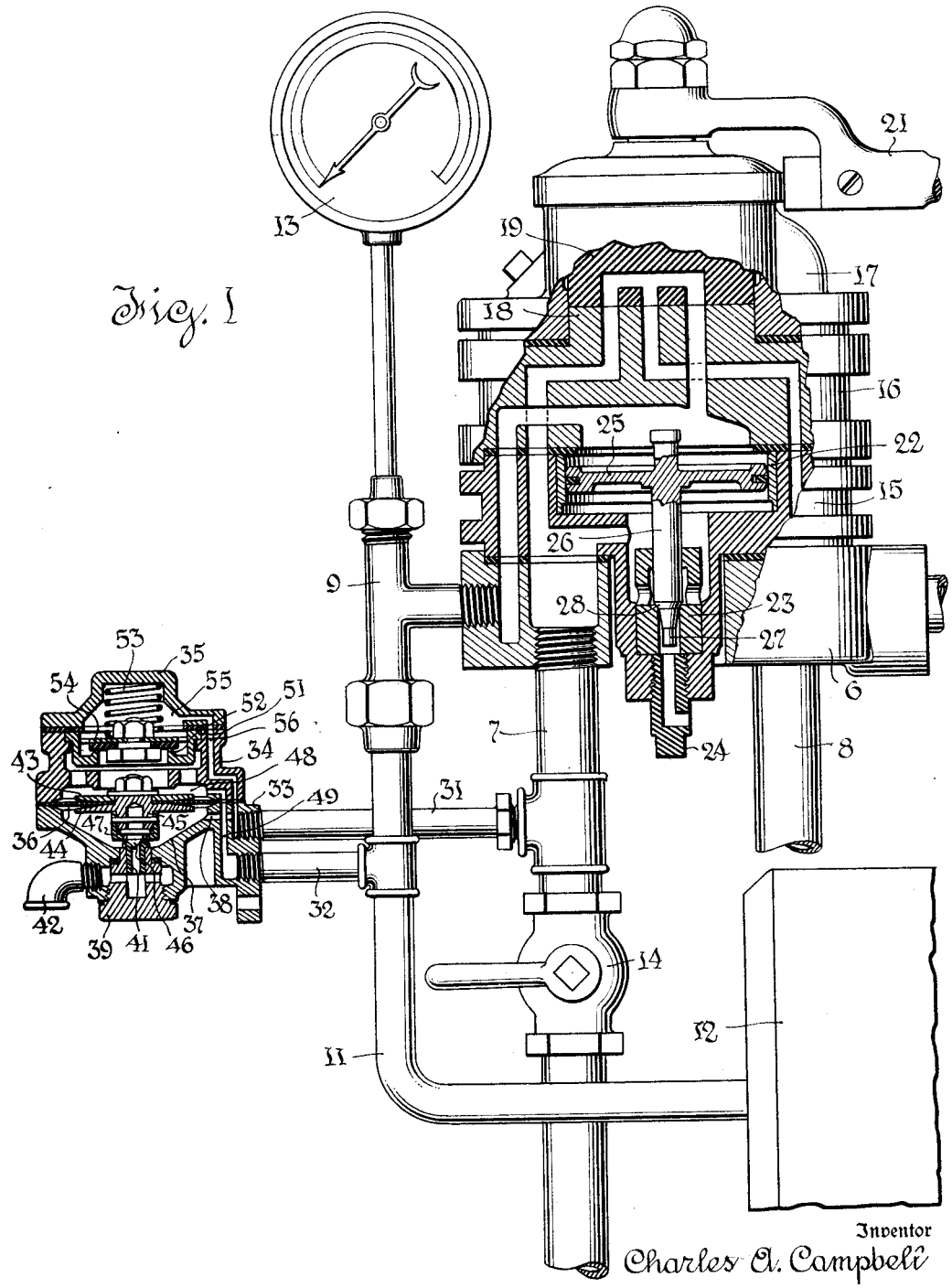

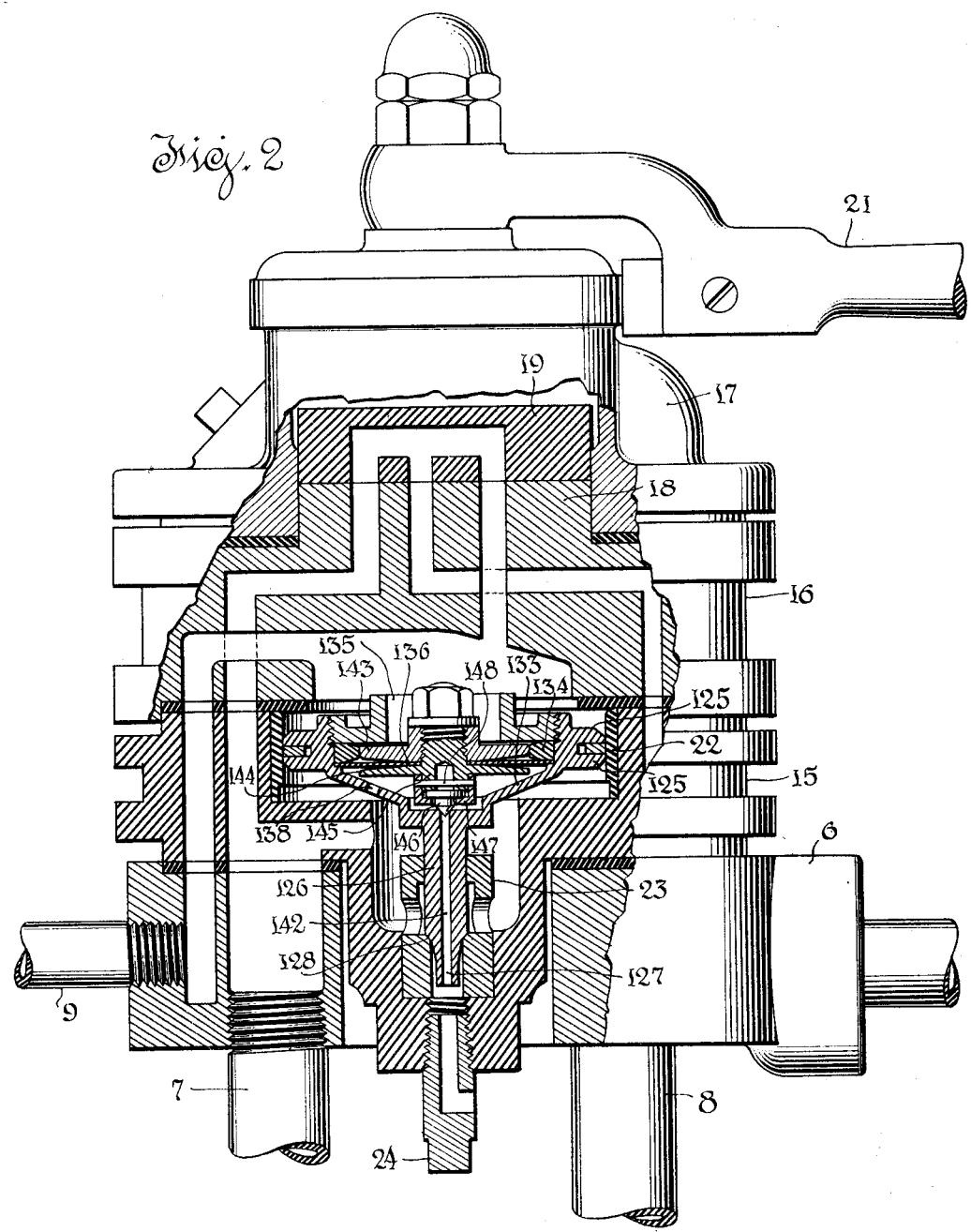

1,913,474

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed August 28, 1931. Serial No. 559,994.

This invention relates to air brakes, and particularly to the equalizing discharge valve units of engineers' brake valves.

The prime purpose of the invention is to increase the sensitiveness of these valves while retaining their present reliability and general operating characteristics.

With the usual piston of 3½ inch diameter, actuating an exhaust valve with a diameter of 15/32 inches, exposed to atmospheric pressure, there is a differential on the piston and valve in a closing direction which amounts to 1.15 pounds when brake pipe and equalizing reservoir pressures are 65 pounds gage. The friction of the piston in its bushing is at times as high as 5 pounds. The cumulative effect of the differential areas, gravity and friction is such that the present equalizing discharge valve cannot be relied upon to open from its seat until brake pipe pressure exceeds equalizing reservoir pressure by at least 1.65 pounds per square inch. Many triple valves will release on a 1 pound increase of brake pipe pressure.

Heretofore brake pipe leakage has usually been sufficient to dissipate pressure surges in the brake pipe during service applications, but the present tendency is toward very long trains, better maintenance of brake pipe and hose and consequently reduced brake pipe leakage. There is also a tendency toward limited quick service venting at the triple valves. Thus, a condition is being reached in which the equalizing discharge valve in the engineer's brake valve is not sufficiently sensitive. It may close and fail to reopen during a moderate brake pressure surge which is yet sufficient to move some triple valves to release.

The present invention provides a secondary equalizing discharge valve more sensitive than the conventional equalizing discharge valve. This secondary valve is of relatively limited capacity. By combining a sensitive small capacity valve in parallel with the present piston-operated large capacity valve, the basic characteristics of both types are combined and a markedly improved action is secured.

An important feature of one embodiment of the invention herein disclosed is that the small capacity sensitive valve is mounted within the piston structure of the piston-actuated equalizing discharge valve in such a way that the piston so equipped may be substituted for the conventional piston in existing valves.

The preferred embodiments of the invention will now be described in connection with the accompanying drawings, in which:—

Fig. 1 is an elevation, partly in section, of the well-known H-6 type engineer's brake valve and connected pipe showing the auxiliary equalizing discharge valve mounted externally to the engineer's brake valve.

Fig. 2 is a somewhat similar view showing the auxiliary equalizing discharge valve mounted in the piston of the main equalizing discharge valve.

Referring to both figures, the pipe bracket portion is indicated at 6 and offers connection for the branch pipe 7 which leads to the brake pipe, for the main reservoir pipe 8, and for the equalizing connection 9. As indicated in Fig. 1, the equalizing reservoir connection 9 is connected by a pipe 11 with the equalizing chamber or reservoir 12. It is also connected with the usual pressure gauge 13.

The double-heading cock 14 is interposed in the branch pipe 7. Similar connections would be used with the structure of Fig. 2, but are not illustrated in that figure.

Again referring to both figures, there is superposed upon the pipe bracket portion 6, an equalizing discharge portion 15 which carries the equalizing discharge mechanism. Superposed on the equalizing discharge portion 15 is the rotary valve seat portion 16, and superposed on the portion 16 is the cap portion 17. The portion 16 carries the seat 18 for the usual rotary valve 19. The valve 19 is turned to its various positions, well-known to those skilled in the art, by the handle 21 which turns a stem swiveled in the cap portion 17 and engaging lugs on the top of the rotary valve 19. The joints between the various parts 6, 15, 16, and 17 are sealed by gaskets in the usual manner, as indicated in the drawings.

Mounted in the equalizing portion 15 are cylinder bushing 22 and a valve seat bushing 23 of well-known form, the valve seat bushing 23 controlling flow to the equalizing discharge outlet fitting 24. All the parts so far described are of ordinary and well-known construction.

Referring now to Fig. 1 alone, there works in the bushing 22 an ordinary equalizing discharge piston 25, having a stem 26, pilot 27, and valve face 28, all of ordinary form. It will be understood that the lower side of the piston is subject to brake pipe pressure arriving through pipe 7. The upper side of the piston is always subject to pressure in the equalizing reservoir 12.

In certain positions, such for example as running position, the brake pipe and the equalizing reservoir receive charging flow from the same source and consequently are at equal pressures.

Leading from branch pipe 7 above the cutout cock 14 is a branch pipe 31, and leading from the equalizing reservoir pipe 11 is a branch pipe 32. These two pipes are connected with the lower body 33 of an auxiliary equalizing discharge unit.

Mounted on top of the body 33 is a middle section 34 and mounted on the section 34 is a cap section 35. The joints between these sections are sealed by suitably ported gaskets, as shown, and the sections are connected by bolts which do not appear in the drawings.

Clamped between the body 33 and the section 34 is a flexible diaphragm 36. The lower side of this diaphragm is subject to pressure in a chamber or recess 37 formed in the body 33 and connected through passage 38 and pipe 31 with the brake pipe branch 7.

The lower part of the body 33 is formed with a threaded aperture into which is screwed a ported plug 39. This plug carries at its center a valve seat bushing 41 which controls a passage leading to the discharge fitting 42.

Mounted in the center of the diaphragm 36 is a hub structure made of two discs 43 and 44 which are clamped together by a stud and nut, as clearly shown in the drawings. These discs have convex faces presented toward the diaphragm. The lower disc 44 carries a hub 45 against the lower end of which is mounted a pin valve 46. This pin valve seats against the lower face of the hub, is laterally shiftable thereon, and is retained by an annular flanged member 47 which is pinned to the hub as shown.

The purpose of making the valve 46 laterally shiftable is to allow it to align itself with the valve seat bushing 41 with which it coacts. The parts are so arranged that in its normal lower position, the valve 46 seats against the bushing 41 and precludes outflow from the brake pipe. When the diaphragm moves upward, unseating valve 46, flow occurs from the pipe 7, through pipe 31, port 38, chamber 37, through valve seat 41, through ports in plug 39 to the discharge connection 42.

The chamber 48 above the diaphragm 36 is connected to the equalizing reservoir by way of passage 49 and pipes 32 and 11. Mounted in the upper portion of the middle section 34 is a valve seat bushing 51 having a central port surrounded by an upwardly extending seat rib 52.

The bushing is held in place by the cap 35 which also serves as a seat for the valve spring 53. This spring 53 seats and loads a poppet valve 54 which coacts with the seat 52. The chamber 55 in the cap is connected by a port 56 with the pipe 31, and consequently, with the brake pipe branch 7.

Consideration of the structure made up of the parts 31 to 56 inclusive will make clear that the valve 46 performs the same function as the valve 28 and that the diaphragm 36 performs the same function as the piston 25, but the diaphragm is far more sensitive than the piston and will open valve 46 to vent the brake pipe to atmosphere upon the existence of pressure differential between the brake pipe branch 7 and the equalizing reservoir 12, far less than sufficient to cause upward movement of the piston 25 from its lower valve-closing position.

It has been heretofore proposed to substitute a diaphragm for the piston 25 of the equalizing discharge valve, but so far no one has provided a satisfactory diaphragm for this purpose. Controlling limitations are the necessary small size of the diaphragm and the comparatively wide range of opening movement of the valve 28. In making use of a piston and valve to take care of all wide pressure variations, such as require rapid discharge, in conjunction with a sensitive diaphragm controlling a small valve of relatively small lift, it becomes practically possible to meet all the requirements of service.

The purpose of the loaded valve 54 is to relieve overcharges in the supplemental reservoir 12, and incidentally, to preclude any possible overstressing of the diaphragm 36. For this last purpose, the location of the valve 54 closely adjacent the diaphragm 36 is an important feature.

The diaphragm-actuated supplementary equalizing discharge valve may be mounted in the piston of the main equalizing discharge valve mechanism. Such a construction is shown in Fig. 2. In this construction the equalizing discharge piston 125 is of annular form open at its center and is connected by a cup-like spider 133 with the stem 126 which has the usual pilot 127 and valve face 128.

There is a port 138 through the spider 133 for the purpose of admitting brake pipe pressure against the diaphragm hereinafter described. The piston 125 is provided with an annular seat upon which is mounted a diaphragm 136. This is held by a clamping ring 134 and an annular nut 135 which last is threaded into the top of the piston 125. The diaphragm 136 is of thin flexible metal like the diaphragm 36 and carries at its center two plates 143 and 144 one of which is threaded to receive a clamping nut, as shown in the drawings.

The lower plate 144 is provided with a hub 145 against the lower face of which is mounted a laterally shiftable pin valve unit 146. This is retained by an annular member having an internal overhanging flange indicated at 147. Member 147 is held in place by a pin 148.

There extends longitudinally through the stem 126, a discharge port 142 and the upper end of this port serves as a seat for the valve 146. It follows from the construction above set forth that the diaphragm 136 is subject on its lower side to brake pipe pressure and on its upper side to equalizing reservoir pressure, and the pin valve 146 controls flow from the brake pipe to atmosphere by way of port 138, port 142 and discharge fitting 24.

Assuming that the piston 125 is in its lowermost position, with the valve 128 closed to its seat, and that pin valve 146 is closed against its seat, the diaphragm 136 will open the valve 146 whenever brake pipe pressure preponderates slightly over supplemental reservoir pressure. Thus the pin valve 146 always opens in advance of the valve 128, and will frequently open when valve 128 remains closed. Minor pressure fluctuations sufficient to open the pin valve 146 can be dissipated by the relatively small venting capacity of the valve.

The supplementary discharge valve mechanism just described with reference to Fig. 2 is the equivalent of similar mechanism described with reference to Fig. 1, except that it does not include the loaded valve for dissipating overcharges in the equalizing reservoir 12. So far as the vent valve mechanism is concerned, such an overcharge dissipating relief valve might be incorporated in a separate structure in substantially the manner shown in Fig. 1, or may be omitted altogether, according to the preferences of the designer.

Similar means for dissipating overcharges in supplemental reservoirs are well known and have been used, but the arrangement illustrated in Fig. 1 is believed to have particular utility because the relief valve is positioned closely adjacent to the diaphragm 36 and, therefore, protects that diaphragm against overload.

While it is a simple matter to make the diaphragm 36 sufficiently rugged to stand any overload that may be encountered, increased sensitiveness can be secured by the use of extremely thin diaphragms, and where extreme sensitiveness is necessary, the use of a closely juxtaposed relief valve is a valuable safeguard.

While the two embodiments above suggested have been described in considerable detail, it is obvious that various modifications can be made by the exercise of ordinary mechanical skill, and no limitation to the specific structures illustrated is implied. The mode of mounting the pin valve disclosed in the present application forms the subject matter of my prior application, Serial No. 521,823, filed March 11, 1931, and consequently is not described nor claimed herein. Any equivalent valve mechanism might be substituted in the present construction, but that shown has desirable operative characteristics.

What is claimed is:—

1. The combination with an engineer's brake valve having a brake pipe connection, and including an equalizing chamber, a brake pipe discharge valve, and a piston connected to actuate said discharge valve and subject in opposite directions to pressure in said equalizing chamber and to brake pipe pressure, of a second valve controlling a brake pipe discharge and having less resistance to opening than the first named discharge valve; and a flexible diaphragm connected to actuate said second valve and subject in opposite directions to pressure in said equalizing chamber and to brake pipe pressure.

2. The combination with an engineer's brake valve having a brake pipe connection, and including an equalizing chamber, a brake pipe discharge valve, and a piston connected to actuate said discharge valve and subject in opposite directions to pressure in said equalizing chamber and to brake pipe pressure, of a pin valve controlling a second and relatively small brake pipe discharge; and a sensitive diaphragm connected to actuate said pin valve and subject in opposite directions to pressure in said equalizing chamber and to brake pipe pressure.

3. The combination with an engineer's brake valve having a brake pipe connection, and including an equalizing chamber, a brake pipe discharge valve, and a piston connected to actuate said discharge valve and subject in opposite directions to pressure in said equalizing chamber and to brake pipe pressure, of a laterally shiftable pin valve controlling a second and relatively small brake pipe discharge; and a thin metallic diaphragm connected to actuate said pin valve and subject in opposite directions to pressure in said equalizing chamber and to brake pipe pressure.

4. The combination with an engineer's brake valve having a brake pipe connection, and including an equalizing chamber, a brake pipe discharge valve, and a piston connected to actuate said discharge valve and subject in opposite directions to pressure in said equalizing chamber and to brake pipe pressure, of a pin valve controlling a second and relatively small brake pipe discharge; and a sensitive diaphragm connected to actuate said pin valve and subject in opposite directions to pressure in said equalizing chamber and to brake pipe pressure, said diaphragm and pin valve being mounted in said piston.

5. The combination with an engineer's brake valve having a brake pipe connection, and including an equalizing chamber, a brake pipe discharge valve, and a piston connected to actuate said discharge valve and subject in opposite directions to pressure in said equalizing chamber and to brake pipe pressure, of a pin valve controlling a second and relatively small brake pipe discharge; and a sensitive diaphragm connected to actuate said pin valve and subject in opposite directions to pressure in said equalizing chamber and to brake pipe pressure, said diaphragm and pin valve being mounted in said piston and the first-named discharge valve being formed with a discharge port controlled by said pin valve.

6. An equalizing discharge valve and piston unit for air brake valves comprising in combination, a piston with connected stem formed with a valve portion, said stem being provided with a longitudinal port, and said piston being formed with an opening of substantial size leading through the piston and surrounded by a diaphragm seat; a diaphragm clamped against said seat and closing said opening; and a valve actuated by motion of said diaphragm relatively to said piston, and controlling said longitudinal port.

7. An equalizing discharge valve and piston unit for air brake valves, comprising in combination, an annular piston element formed with a diaphragm seat; a valve stem having a valve face and an axial bore; means connecting said piston element and stem and permitting the passage of air; a diaphragm clamped against said seat; and a pin valve carried by said diaphragm and coacting with the upper end of said axial bore to open and close the same.

8. An equalizing discharge valve and piston unit for air brake valves, comprising in combination, an annular piston element formed with a diaphragm seat; a valve stem having a valve face and an axial bore; means connecting said piston element and stem and permitting the passage of air; a diaphragm clamped against said seat; and a pin valve carried by said diaphragm, laterally shiftable thereon, and coacting with the upper end of said axial bore to open and close the same.

9. The combination with an engineer's brake valve having a brake pipe connection, and including an equalizing chamber, a brake pipe discharge valve, and a piston connected to actuate said discharge valve and subject in opposite directions to pressure in said equalizing chamber and to brake pipe pressure, of a pin valve controlling a second and relatively small brake pipe discharge; a sensitive diaphragm connected to actuate said pin valve and subject in opposite directions to pressure in said equalizing chamber and to brake pipe pressure; and a spring-loaded relief valve mounted adjacent said diaphragm and operative to discharge to the brake pipe overcharges in the equalizing chamber.

In testimony whereof I have signed my name to this specification.

CHARLES A. CAMPBELL.